United States Patent [19]

Fisher

[11] Patent Number: 4,517,234
[45] Date of Patent: May 14, 1985

[54] HEAT RECOVERABLE SLEEVE FORMING WRAP

[75] Inventor: Howard Z. Fisher, Hummelstown, Pa.

[73] Assignee: AMP Incorporated, Harrisburg, Pa.

[21] Appl. No.: 264,739

[22] Filed: May 18, 1981

[51] Int. Cl.³ .................. H02G 15/18; H02G 3/04
[52] U.S. Cl. .................................... 428/119; 428/36; 428/122; 428/157; 428/192; 174/DIG. 8; 138/158; 138/163
[58] Field of Search .................. 428/127, 128, 129, 99, 428/100, 140, 157, 192, 119, 122; 138/156, 158, 163; 174/DIG. 8; 24/259 R, 198, 259 FS, 35

[56] References Cited

U.S. PATENT DOCUMENTS

| | | | |
|---|---|---|---|
| 1,015,919 | 1/1912 | Wardell | 428/140 |
| 2,665,869 | 1/1954 | Samuels | 24/259 R |
| 3,091,487 | 9/1963 | Gallagher et al. | 24/259 R |
| 3,099,216 | 7/1963 | Jakobsen et al. | 138/156 |
| 3,112,542 | 12/1963 | Brunson | 24/259 R |
| 3,379,218 | 4/1968 | Conde | 174/DIG. 8 |
| 3,455,336 | 7/1969 | Ellis | 138/156 |
| 3,542,077 | 11/1970 | Muchmore | 174/DIG. 8 |
| 3,574,313 | 4/1971 | Tanaka | 174/DIG. 8 |
| 3,679,531 | 7/1972 | Wienand et al. | 428/192 |
| 3,847,721 | 11/1974 | Evans | 428/36 |
| 4,123,047 | 10/1978 | Koht et al. | 24/252 R |
| 4,276,909 | 7/1981 | Biscop | 174/DIG. 8 |
| 4,339,488 | 7/1982 | Brokmann | 428/157 |
| 4,371,578 | 2/1983 | Thompson | 428/99 |
| 4,378,393 | 3/1983 | Smuckler | 428/192 |
| 4,388,488 | 6/1983 | Wlcek et al. | 174/DIG. 8 |

FOREIGN PATENT DOCUMENTS

| | | |
|---|---|---|
| 0036250 | 9/1981 | European Pat. Off. |
| 2909979 | 9/1980 | Fed. Rep. of Germany |
| 1261122 | 1/1972 | United Kingdom |
| 2054781 | 2/1981 | United Kingdom |
| 2061025 | 9/1981 | United Kingdom |

Primary Examiner—Alexander S. Thomas
Attorney, Agent, or Firm—Allan B. Osborne

[57] ABSTRACT

The present invention relates to a flat length of heat recoverable material with integral latching means so that the material may be wrapped around a cable, pipe or similar structure, latched together and shrunk down onto the structure. More particularly, the wrap includes a length of heat recoverable material with a metal clasp molded or otherwise attached to one end and an integrally molded, clasp-receiving rib on the opposite end.

3 Claims, 7 Drawing Figures

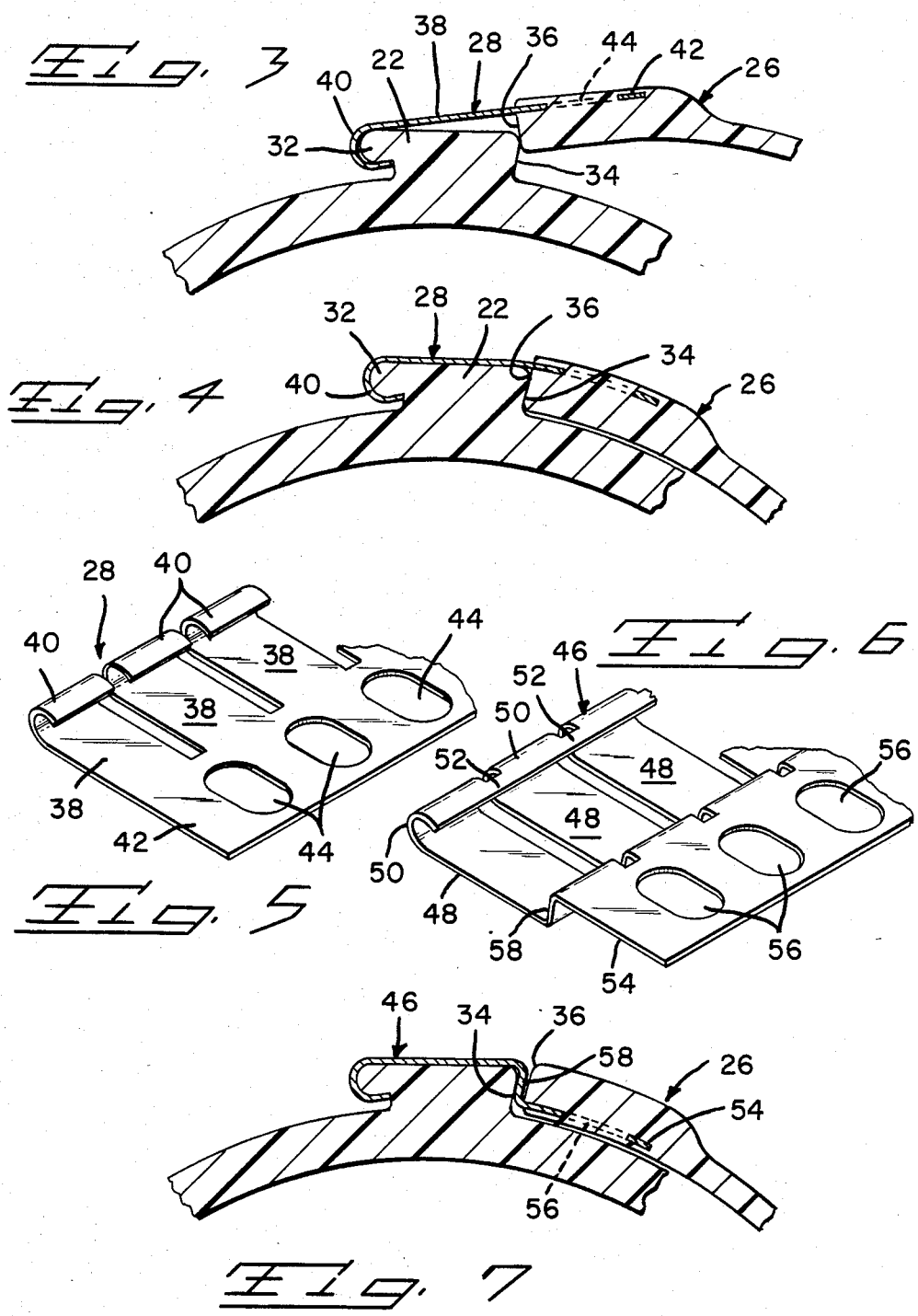

HEAT RECOVERABLE SLEEVE FORMING WRAP

BACKGROUND OF THE INVENTION

1. The Field of the Invention

This invention relates to heat recoverable material having integral latching means associated therewith so that the material may be wrapped around a structure, such as a cable, the ends latched together and heated so that it recovers towards its original smaller size.

2. The Prior Art

The present invention is a novel improvement and a departure from at least the following:

| U.S. Pat. No. | Patentee | Class/Subclass |
|---|---|---|
| 3,455,336 | Ellis | 138/156 |
| 4,123,047 | Koht et al | 269/238 |

A desirable method of repairing a tear in the insulation of a cable or a hole in a pipeline is to shrink a sleeve of heat recoverable material down around the damaged site. However, it may be impossible or impractical to place a sleeve onto the cable or pipe for one reason or the other. Accordingly, workers in the field have been working on lengths of material, referred to as a "wrap", which can be wrapped around the structure and then shrunk down. However, because the recovery forces in the material are so great, difficulties have been encountered in keeping the ends of the wrap together. Adhesives have been tried without great success. The first successful mechanical means for holding the ends together was disclosed by Ellis. In molding his material, rails on each end were molded as an integral part. Each rail has an enlarged, non-symmetrical top portion and a reduced neck portion to provide a downwardly facing shoulder. These rails are physically confined during expansion of the wrap. In use, the wrap is wrapped around a structure and, with the two rails held together, a metal, C-shaped fastener is placed across both rails by sliding with the sides of the fastener being positioned under the shoulders. Upon the application of heat, the wrap material recovers down into a tight band around the structure. The rails, not being originally expanded, retain their size and shape during the recovery and thus, the integrity of the latch is maintained. Where a suitable heat activated adhesive is used, or where the material is self bonding, the metal fastener and rails may be cut away to reduce the profile of the wrap.

Koht and others subsequently disclosed another mechanical device for gripping and keeping the two ends of the wrap closed during recovery. Their mechanical device consists of a plurality of manually operable clips connected together in a given length by means of a flexible cable. The clips have a pair of cooperating jaws which engage and clamp the two laid-together ends of the wrap. The heat recoverable material of Koht et al differs from that of Ellis in that the entire length of material is expanded including the ends.

SUMMARY OF THE INVENTION

The invention disclosed herein is a novel means for holding the two ends of a wrap together during its recovery to its original dimensions. One end of the material has a rib thereon with the rib being undercut to provide an overhang. A clasp is either co-extruded into the opposite end or embedded thereto subsequent to extrusion. The free end of the clasp is bent around into a C-shaped section and inwardly from that section, either the clasp itself or the embedding material is formed to provide an outwardly projecting step. Latching is done by holding the clasp at an angle relative to the rib so that the C-shaped section can be placed in under the overhang; then the clasp end is rotated downwardly so that the step bears against the side of the rib opposite the overhang.

BRIEF DESCRIPTION OF THE DRAWINGS

FIGS. 3 and 4 are cross-sectional views showing the method of latching the two ends of the wrap together as well as the structure of one embodiment of the cooperating latching means on the ends of the wrap;

FIG. 5 is a perspective view of the embodiment of the clasp of FIGS. 3 and 4;

FIG. 6 is a perspective view of another embodiment of the clasp constructed in accordance with the present invention; and FIG. 7 is a cross-sectional view of the embodiment of FIG. 6 showing its placement in the wrap end and the two ends latched together.

DESCRIPTION OF THE INVENTION

Figure 1:
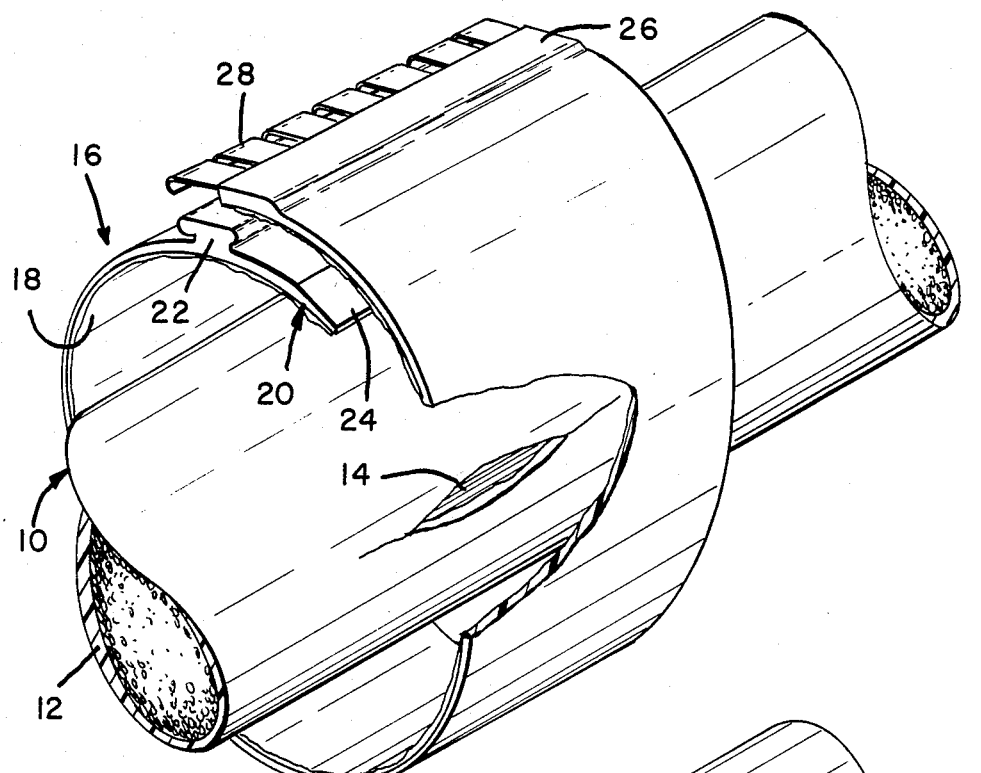
FIG. 1 is a perspective view showing the wrap of the present invention being placed around a damaged cable.
Figure 2:
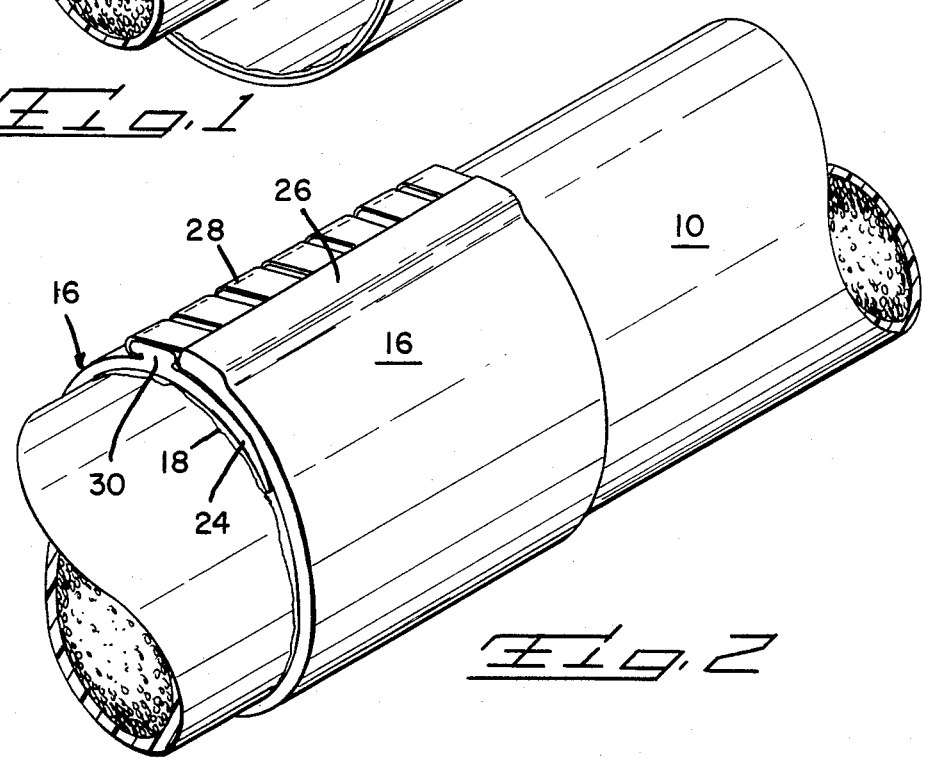
FIG. 2 is a perspective view showing the wrap after being recovered down onto the cable.

Cable 10 shown in FIGS. 1 and 2 represents a telephone cable containing hundreds of small gauge telephone lines. The outer protective jacket 12 has been torn open as indicated by reference numeral 14 and must be repaired to prevent ingress of moisture. As the cable extends for a considerable distance in either direction, a tubular heat recoverable article cannot be used. Accordingly, cross-linked, heat recoverable wrap 16, constructed in accordance with the concepts of the present invention, is employed to provide an effective, moisture-proof band. The wrap, having a heat activated adhesive 18 on its inner surface, is wrapped around the cable in overlying registration with the damaged area 14. The end 20 of the wrap which carries rib 22 thereon and whose beveled free end 24 extends beyond the rib, is placed under opposite end 26 of the wrap which carries clasp 28. The clasp is latched onto rib 22 and heat is applied. Longitudinal shrinkage occurs so that the wrap shrinks down or recovers around the cable. Preferably, the diameter of the cable is greater than the ultimate recovery of the wrap so that the recovery forces in the wrap effect an extremely tight band around the cable. The adhesive fuses and flows into the tear and also provides adhesion between the wrap and cable jacket after cooling.

FIG. 2 shows the wrap after being recovered about the cable. As indicated by reference numeral 18, the adhesive has flowed completely around the cable and some has been squeezed out along the edges 30 of the wrap. The beveled free end 24 provides a smooth overlap for end 26. Additionally, adhesive on the inside surface of end 26 has bonded that end to end 24 so that the wrap is now, in effect, a continuous one piece covering.

FIG. 3 shows the structure of rib 22 and clasp 28 in section. The rib is undercut on one side to provide an overhang 32. The opposite side 34 of the rib is straight. End 26 is thicker to accommodate the clasp and to provide a face 36 of substantially the same thickness as rib 22.

FIG. 5 shows clasp 28 in perspective. It is an elongated member preferably stamped and formed from a coplanar strip of metal (not shown) such as steel. Other metals and other materials having sufficient rigidity would be suitable also. Fingers 38 are defined along one side by slotting. The free ends of the fingers are formed around into C-shaped hooks 40. The remaining width, hereinafter referred to as strap 42 of the clasp, contains spaced holes 44.

Returning to FIG. 3, the section drawing shows that strap 40 is embedded in end 26 with the material filling holes 44 to anchor the strap. The strap is positioned near the upper surface of that end.

The ends of wrap 16 are latched together by catching hooks 40 onto overhang 32. This requires angling end 26 as illustrated in FIG. 3. With the hooks caught, the end 26 is brought down so that face 36 abuts side 34 of the rib straight on. The two ends are latched together as shown in FIG. 4 and cannot come apart under the linear pull that the latched ends will see during recovery. However, the ends may be unlatched prior to recovery simply by pulling end 26 upwardly to clear side 34 and then pushing forwardly so that hooks 40 can clear overhang 32.

FIG. 6 is a perspective view of another embodiment of a clasp. This clasp, indicated by reference numeral 46, has a plurality of fingers 48 on one side with the free ends formed into C-shaped hooks 50. The slots defining the fingers are confined within the clasp material so that each hook is connected to the adjacent hook by a strip of material indicated by reference numeral 52. Strap 54 contains spaced holes 56. However, in this embodiment, the strap is offset vertically from the fingers by bend 58.

Clasp 46 is embedded in end 26 near the lower surface so that bend 58 covers face 36 and abuts side 34 when the two ends are latched together as shown in FIG. 7.

The present invention may be subject to many modifications and changes without departing from the spirit or essential characteristics thereof. The present embodiment is therefore intended in all respects as being illustrative and not restrictive of the scope of the invention.

What is claimed is:

1. A heat recoverable, sleeve forming wrap, comprising,
   a. a length of cross-linked, expanded, heat recoverable material having first and second ends with the second end being thicker than the first end to provide an outwardly facing surface;
   b. An elongated upright rib positioned adjacent the first end and having on a side facing away from the first end, a downwardly facing shoulder and on the opposite side a vertical surface of about the same thickness as the outwardly facing surface on the second end;
   c. an elongated clasp having projecting C-shaped means along one side, said clasp being attached to the second end of the material with the C-shaped means extending outwardly over the outwardly facing surface so that upon forming the wrap into a sleeve, the two ends thereof may be fastened together by latching the C-shaped means in under the downwardly facing shoulder on the one side of the rib and removably locking the C-shaped means by abutting the outwardly facing surface against the vertical surface on the opposite side of the rib.

2. The wrap of claim 1 wherein the C-shaped means includes a plurality of fingers with the free ends being formed around into C-shaped hooks.

3. The wrap of claim 2 wherein the hooks are interconnected adjacent the free ends thereof.

* * * * *